3,418,032
VARIFOCAL LENS BINOCULAR
Kaku Kajiro, 495 Tozukamachi 1-chome,
Shinjuku-ku, Tokyo, Japan
Filed Dec. 21, 1964, Ser. No. 419,941
7 Claims. (Cl. 350—35)

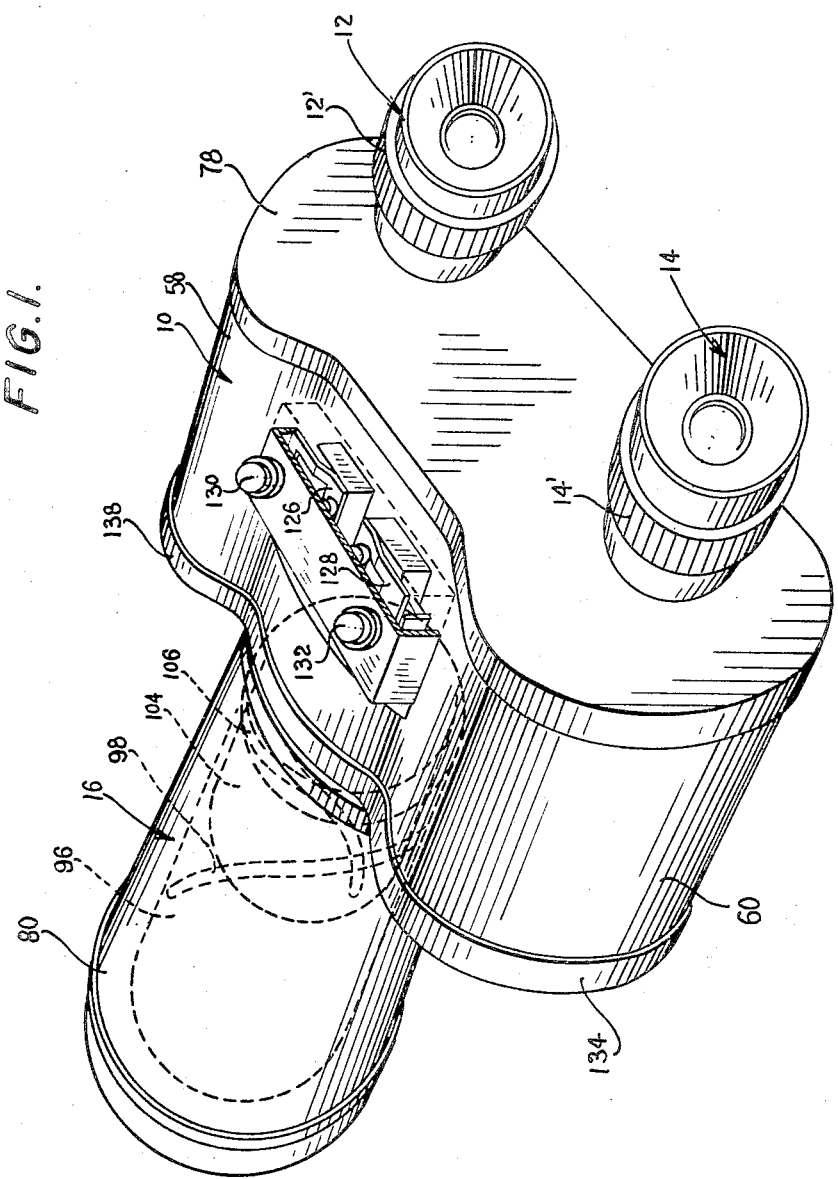

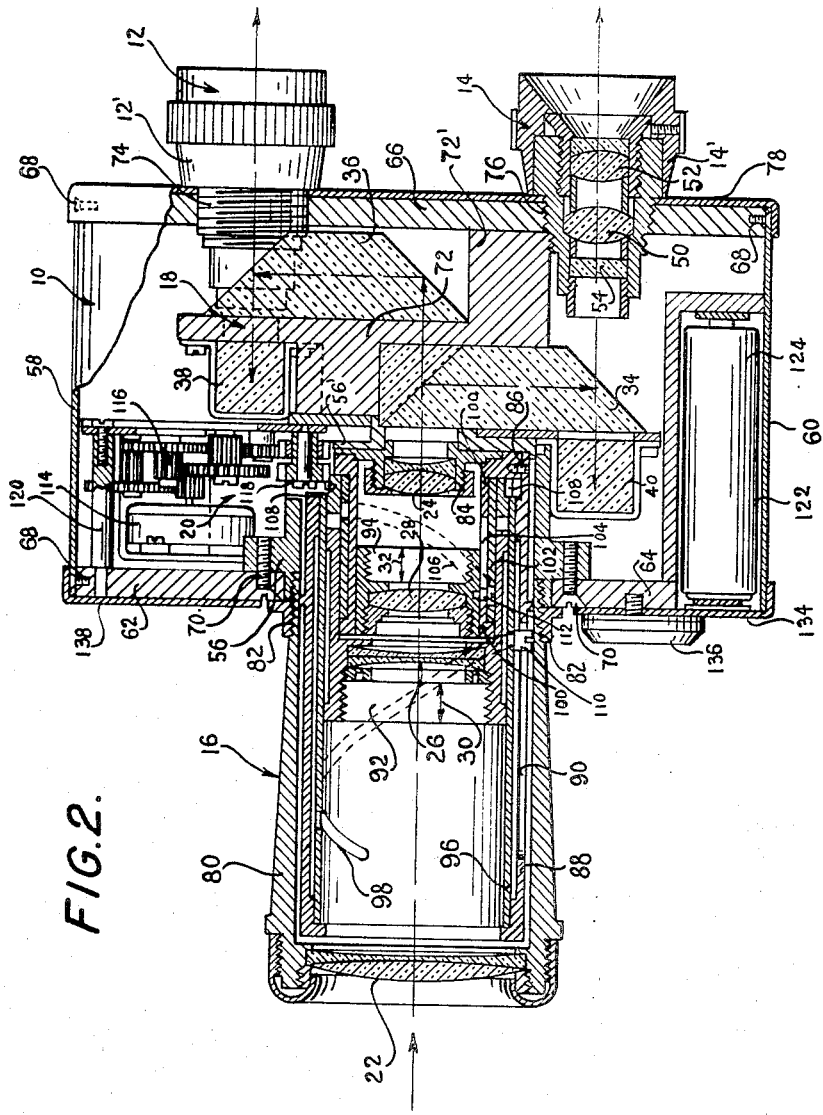

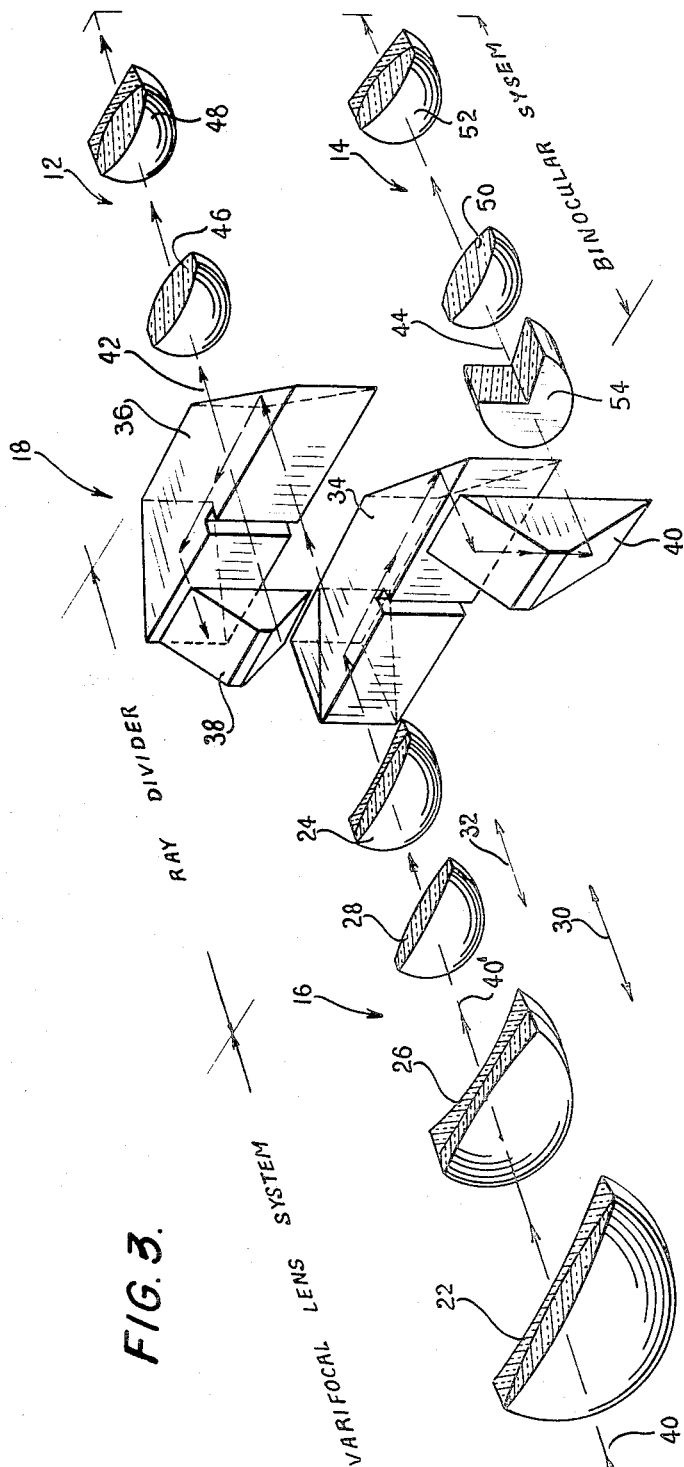

ABSTRACT OF THE DISCLOSURE

A varifocal or zoom lens binocular. A zoom lens binocular in which the zooming or magnification varying effect for both eyepieces of the binocular is obtainable with one zoom lens set in a continuous, smooth and uniform manner by battery operable means and in which all of the parts including the movable and operable parts are mounted within and on a binocular housing structure.

---

The present invention relates to a varifocal or zoom lens binocular.

The prime object of the present invention is to produce a binocular in which a binocular lens system is combined with a single varifocal or zoom lens set or system.

An ancillary object of the invention is to produce a zoom lens binocular in which the zooming effect or magnification varying effect for both eyepieces or lenses of the binocular is obtainable in a continuous, smooth and uniform manner.

A still further object of the invention is the production of a zoom lens binocular embodying electrically operable means for actuating the varifocal lens system, and in which the mechanism and parts of the binocular are arranged in a balanced and light-weight structure.

Known zoom binoculars require a pair of zoom lens sets one for each of the two eyepieces of the binocular. Such known zoom binoculars require such two sets of zoom lenses or systems of perfectly the same performance in every respect; and as a result mechanical difficulty is usually encountered in trying to make the zooming movement of one zoom lens set match with precision that of the other zoom lens set.

This requirement and difficulty are eliminated by the varifocal or zoom binocular of the present invention. By means thereof discordance between images for both eyes is prevented. The resulting structure also allows production of the zoom binocular at a low cost since the parts and the operating or adjusting means for the zoom lens system are required for only one zoom lens set.

To the accomplishment of the foregoing objects and such other objects as may hereinafter appear, the present invention relates to the varifocal or zoom lens binocular as more particularly defined in the appended claims taken together with the following specification and the accompanying drawings, in which:

FIG. 1 is a perspective view of the varifocal lens binocular structure of the present invention;

FIG. 2 is a detail view thereof taken largely in cross-section in a horizontal plane thereof; and FIG. 3 is an isometric view with some parts shown in section of the optical elements involved in the combination of the varifocal lens system, the ray divider and the binocular system which together make up the varifocal lens binocular of the present invention.

Referring now more in detail to the drawings, the varifocal or zoom lens binocular of the invention comprises in its structural aspects a frame generally designated as 10 provided with binocular-spaced eyepieces 12 and 14, a varifocal lens system generally designated as 16 attached to said frame midway the spaced eyepieces 12 and 14 as best shown in FIGS. 1 and 2 of the drawings, a ray divider system generally designated as 18 located axially between the varifocal lens system 16 and the binocular-spaced eyepieces; said ray divider system having means arranged for dividing rays from the single varifocal lens system and leading the divided rays to the eyepieces, means generally designated as 20 being provided for adjusting the varifocal lens system to effect a zoom operation thereof.

FIG. 3 portrays the optical elements and the interrelation therebetween of the varifocal lens system, the ray divider and the binocular system, which together produce the varifocal lens binocular of the invention.

The varifocal lens system 16 comprises the fixed lenses 22 and 24 at the opposite ends of the varifocal lens set and the movable lenses 26 and 28 therebetween movable relatively to each other and relatively to the fixed lenses 22 and 24, the movement of the lens 26 being indicated by the double arrow 30 and the movement of the lens 28 being indicated by the double arrow 32.

The ray divider 18 comprises a set of prisms functioning to divide by reflection the rays emanating from the varifocal lens system leading part of the rays to the right eyepiece 12 and part of the rays to the left eyepiece 14. The prism set comprises a front prism 34, a rear prism 36 and the side prisms 38 and 40 shaped and arranged as clearly indicated in FIG. 3, these prisms functioning as there indicated to divide the line of rays 40' into the two lines of rays 42 and 44 leading these rays respectively to the eyepieces 12 and 14, all as depicted by the directed arrows shown in FIG. 3 of the drawings.

The eyepiece 12 comprises the lens elements 46 and 48 and the eyepiece 14 comprises the lens elements 50 and 52. The system also includes an element for equalizing the optical paths and this may comprise a block piece 54 which is inserted to form part of the eyepiece 14.

Referring now to FIG. 2 of the drawings, the frame 10 comprises a housing consisting of a central tubular portion 56 formed with a centrally orificed rear wall 56', sheet metal right and left side walls 58 and 60, front sectional plates 62 and 64 and a rear plate 66, these parts being secured together by any suitable means such as screws 68, 68 for attaching the side walls 58, 60 to the plates 62, 64 and 66 and screws 70, 70 for attaching the front sectional plates 62, 64 to flange portions formed in the central tubular section 56.

The prism elements 34 to 38 which make up the ray divider are secured in any desirable way to a mount 72 and the mount encased by the housing 10 is secured by screws (not shown) to the orificed wall section 56' of the central tubular section 56. The prism mount is also securely held in position by having parts thereof, such as the parts 72', engaging the interior face of the plate 66.

The eyepieces 12 and 14 comprise lens mounts 12' and 14' structured as clearly shown in FIG. 2, each lens mount holding its respective lens elements. The lens mounts 12' and 14' are removably attachable to the rear housing plate 66 by the respective threaded engagements 74 and 76. The plate 66 is surmounted by a flanged cover plate 78 which is held in position by the securement of the lens mounts 12' and 14' as clearly shown in FIG. 2 of the drawings.

The varifocal lens system 16 is mounted in and attached to the central tubular section 56 and is thus attached to the frame or housing 10 midway the spaced eyepieces 12 and 14. The front stationary lens 22 is mounted in a tubular barrel 80 which is removably attachable to the housing 10 by being threadedly received as at 82 by an interior wall part of the central tubular section 56. The rear fixed lens 24 is held in a lens mount 84 which is fixedly fitted into the rear end of an inner cylinder 100 in turn attached by the screws 86 to an outer cylinder 88, these parts being held in fixed position in the housing 10 by the attachment of the lens mount 84 to the rear wall section 56' (of the central tubular section 56) by suitable securing means. The cylinder 88 is provided with a linear slot 90, and the cylinder 100 is provided with a linear slot 104.

The movable lens 26 is mounted in a barrel 92 and the movable lens 28 is mounted in a barrel 94. Arranged between the lens barrel 92 and the cylinder 88 is a sleeve 96 formed with a helicoid cam slot 98. A sleeve 102 formed with a helical slot 106 is arranged between the lens barrel 94 and the cylinder 100. The lens barrel 92 telescopes in the sleeve 96; and the lens barrel 94 telescopes in the cylinder 100. The sleeves 96 and 102 nest and are secured together at their rear ends, and the sleeve 102 is formed circumferentially at its rear end with gear teeth 108 defining a driven gear. Upon rotation of this gear in one direction or the other, the secured together sleeves 96 and 102 rotate and thereby (a) the lens barrel 92 and its lens 26 will be moved linearly in one or the other of its opposite directions by the interrelation of a screw pin 110 fitted into the lens barrel 92, riding in the helicoid cam slot 98 in the sleeve 96 and constrained by the linear slot 90 in the cylinder 88, and (b) the lens barrel 94 and its lens 28 will be moved in its opposite directions by the interrelation of a screw pin 112 fitted to the lens barrel 94, riding in the helical cam slot 106 in the sleeve 102 and constrained by the linear slot 104 in the cylinder 100.

For actuating the gear 108 to effect the movement of the varifocal lenses 26 and 28, there is provided a motor, preferably a battery operated motor 114 which operates a reduction gear train 116 for rotating an end pinion 118 which latter meshes with the teeth of the gear 108. The motor and gear train are formed into a unit, and housed by the housing frame 10, is attached as by the anchoring studs 120 to the front plate section 62. The housing section 60 is formed with a series of compartments 122 for receiving a series of batteries 124 (one being shown in the drawings). The battery system is connected to the motor by wiring (not shown) through a right-hand switch 126 and a left-hand switch 128 operated by switch buttons 130 and 132, the said switch elements being fixedly mounted on the top of the casing 10 as best shown in FIG. 1 of the drawings. For access to the battery compartments, the front plate section 64 is surmounted by a cover plate 134 which is provided with a wheel 136 formed with a threaded shank functioning for removably attaching the cover plate 134 to the plate section 64. At the right side of the housing there is provided a cover plate 138 for the plate section 62.

The structure, use and operation of the varifocal lens binocular of the invention and the advantages thereof will be fully apparent from the above detailed description thereof. Upon the actuation of the right and left-hand switches 126 and 128 and the consequent operation of the battery operated motor 114, the varifocal lens system 16 will be operated to vary the magnification of the binocular view observed through the eyepieces 12 and 14 while maintaining the object viewed in its proper focus. The ray divider system 18 functions for dividing the rays emanating from the single varifocal objective leading the divided rays to the eyepieces 12 and 14 of the binocular.

It will be apparent that many changes may be made in the embodiment of the invention shown without departing from the spirit of the invention defined in the following claims.

I claim:
1. A varifocal or zoom lens binocular comprising a frame provided with binocular-spaced eyepieces, a varifocal lens system attached to said frame midway the spaced eyepieces, a ray divider system in said frame located axially between the varifocal lens system and the binocular-spaced eyepieces, said ray divider system having means arranged for dividing rays from the varifocal lens system and leading the divided rays to the eyepieces, and means in said frame connected to the varifocal lens system for adjusting the varifocal lens system to effect a zoom operation thereof, comprising a motor in said frame and means connecting the motor to the varifocal lens system.

2. A varifocal or zoom lens binocular comprising a housing, binocular-spaced eyepieces fixed to said housing, a varifocal lens system attached to said housing midway the spaced eyepieces, said varifocal lens system including at least one movable lens adjustable to vary the degree of magnification of the system and effecting the self-focusing thereof, a ray divider system in said housing located axially between the varifocal lens system and the binocular-spaced eyepieces having means arranged for dividing rays from the varifocal lens system and leading the divided rays to the eyepieces, and means for operating the varifocal lens system to effect a zoom operation thereof, comprising a motor in said housing and means connecting the motor to said movable lens.

3. The varifocal or zoom lens binocular of claim 2 in which the motor is a battery operable electric motor, said housing being further provided with a compartment for receiving a battery system, and is provided with switches connecting said battery system to the said motor, said switches including switch elements fixedly mounted on the exterior of the housing, said switch elements being operable for energizing the motor.

4. A varifocal or zoom lens binocular comprising a housing, binocular-spaced eyepieces fixed to said housing, a varifocal lens system attached to said housing midway the spaced eyepieces, said varifocal lens system including relatively movable lenses adjustable to vary the degree of magnification of the system and effecting the self-focusing thereof, a ray divider system in said housing located axially between the varifocal lens system and the binocular-spaced eyepieces, said ray divider system comprising a set of prisms arranged for dividing rays from the varifocal lens system and leading the divided rays to the eyepieces, and means for operating the varifocal lens system to effect a zoom operation thereof, comprising a motor in said housing and means connecting the motor to said relatively movable lenses.

5. The varifocal lens binocular of claim 4, in which said relatively movable lenses are mounted in linearly movable barrels, and said connecting means comprises a train of reducing gears connected at one end to the motor and at the other end to means for linearly moving said barrels.

6. The varifocal or zoom lens binocular of claim 4 in which said housing is also formed with a compartment for receiving a battery system and is provided with switches for connecting said battery system to said motor, said switches including switch elements fixedly mounted on the exterior of the housing, said switch elements being operable for actuating said motor.

7. The varifocal or zoom lens binocular of claim 6 in which the relatively movable lenses of the varifocal lens system are movable in opposite directions to vary the magnification of the zoom lens in either one or the opposite direction, said switch elements comprising two switch elements fixedly mounted on the exterior of the housing, one for varying the magnification in one direction and the other for varying the magnification in the other direction.

(References on following page)

References Cited

UNITED STATES PATENTS

| | | | |
|---|---|---|---|
| 2,655,076 | 10/1953 | Armstrong | 350—82 |
| 2,873,646 | 2/1959 | Angenieux | 350—187 |
| 2,924,146 | 2/1960 | Back | 350—187 |
| 3,157,881 | 11/1964 | Jenkins et al. | 350—187 |
| 3,267,828 | 8/1966 | Raab | 350—187 |
| 3,312,518 | 4/1967 | Bushnell. | |

FOREIGN PATENTS 465,592  12/1913  France.

DAVID SCHONBERG, *Primary Examiner.*

M. TOKAR, *Assistant Examiner.*

U.S. Cl. X.R.

350—187